United States Patent
Amick

[11] 3,804,428
[45] Apr. 16, 1974

[54] SAILING VEHICLE
[76] Inventor: James L. Amick, 1464 Cedar Bend Dr., Ann Arbor, Mich. 48105
[22] Filed: Oct. 26, 1972
[21] Appl. No.: 301,230

[52] U.S. Cl.............. 280/8, D71/1 G, 114/43, 280/29
[51] Int. Cl........................................... B62d 39/00
[58] Field of Search.............. 114/43, 39, 665 H; 280/213, 8, 1.21, 1.12, 29; 244/45 R, 91, 2; D14/3 G, 3 K; D71/1 G

[56] References Cited
UNITED STATES PATENTS
| | | | |
|---|---|---|---|
| 2,804,038 | 8/1957 | Barkla | 114/66.5 H |
| 3,395,664 | 8/1968 | Greenberg et al. | 114/43 X |
| 2,940,688 | 6/1960 | Bland | 244/2 |

Primary Examiner—Leo Friaglia
Assistant Examiner—Randall A. Schrecengost
Attorney, Agent, or Firm—Olsen and Stephenson

[57] ABSTRACT

A land or ice sailing vehicle that has a fixed wing, running gear means and a steering system that enables the pilot to steer the runner means so as to adjust the yaw angle of the craft to obtain the desired wind attach angle. This structure eliminates some of the primary sources of aerodynamic losses found in conventional sailing vehicles in which the main running gear means are fixed and the sail is movable to adjust the angle of attack.

13 Claims, 7 Drawing Figures

PATENTED APR 16 1974　　　　　　　　　　　3,804,428
SHEET 1 OF 2
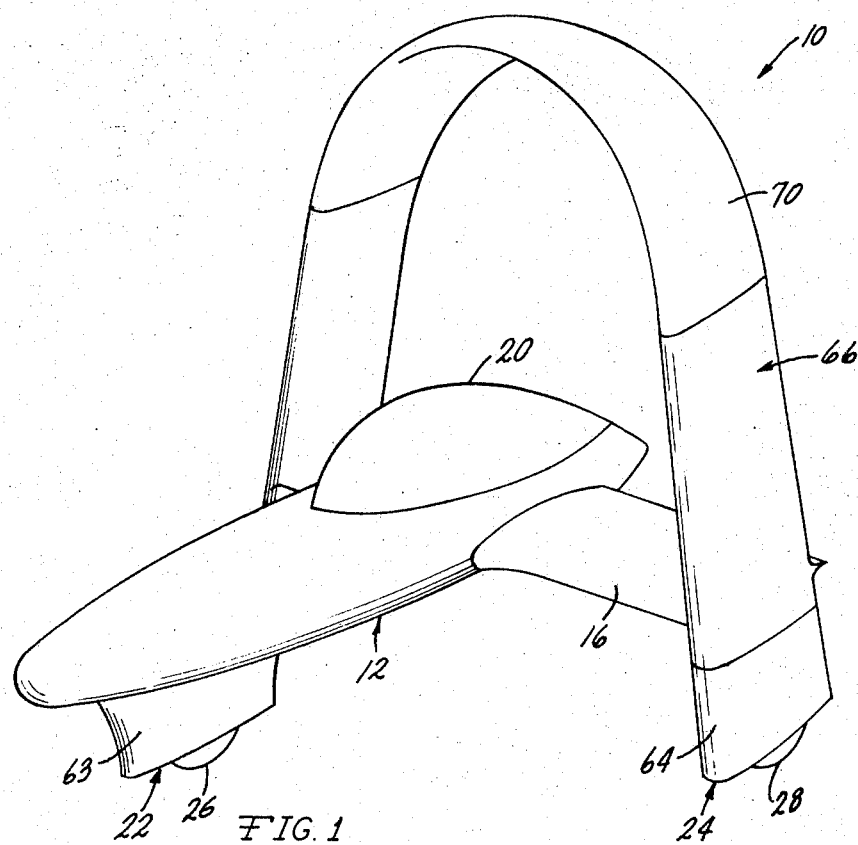
FIG. 1
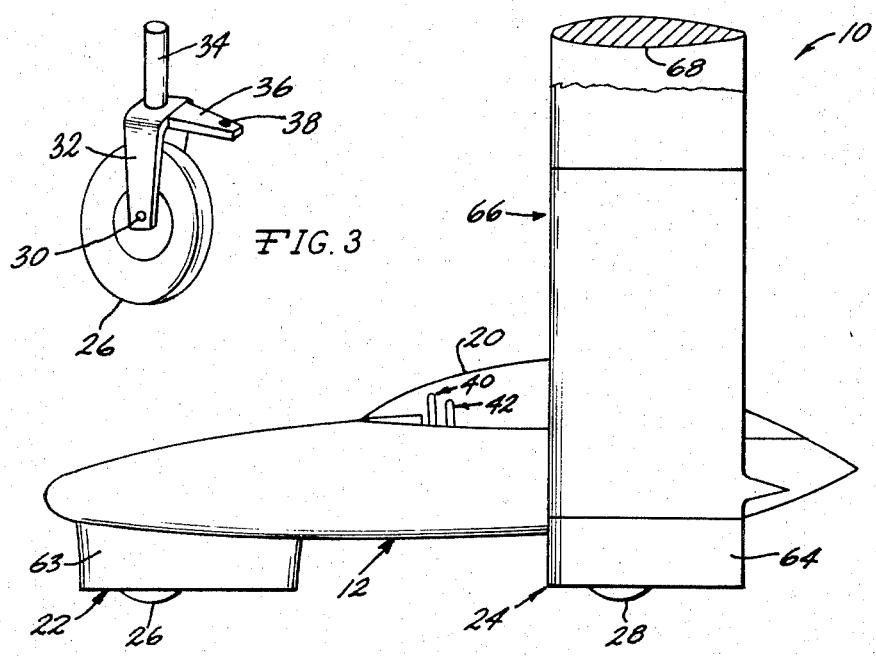
FIG. 3
FIG. 2

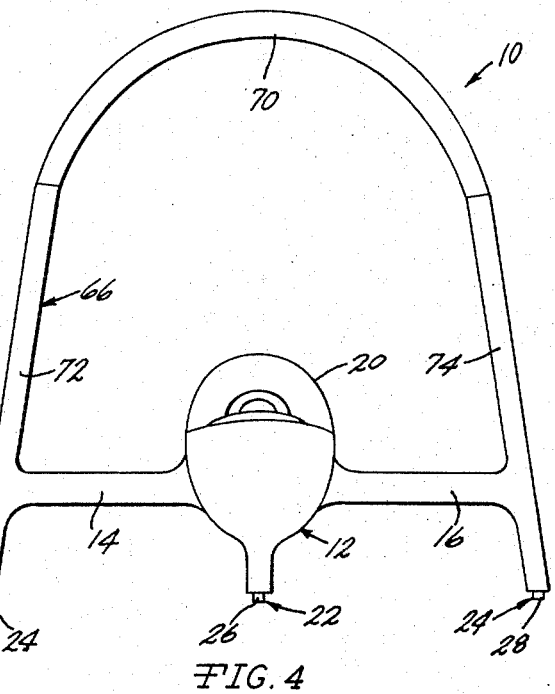
FIG. 4
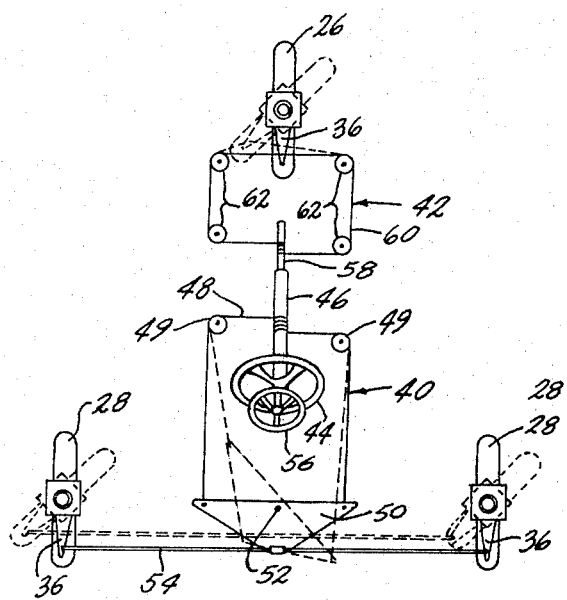
FIG. 6
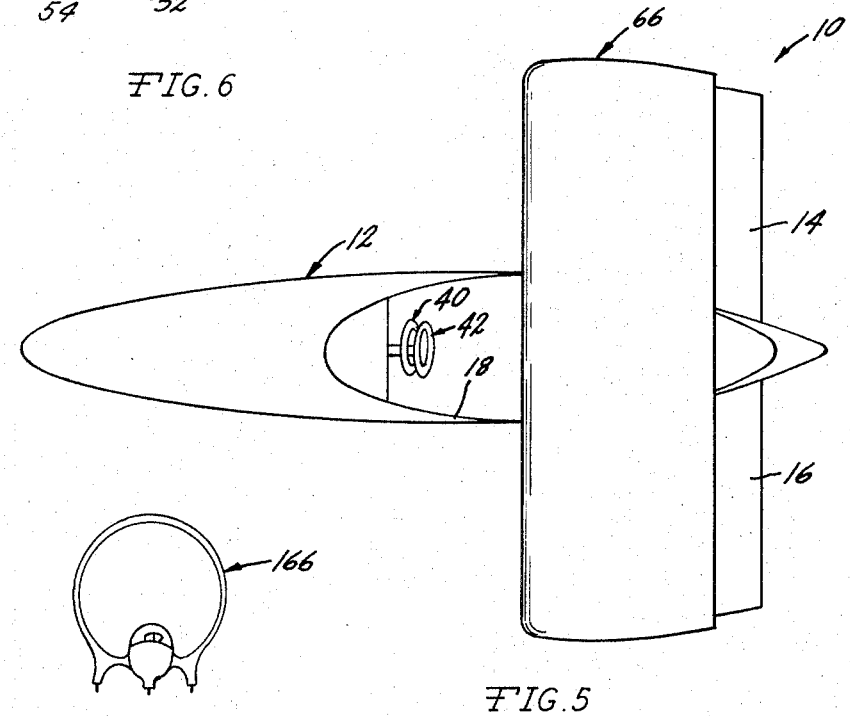
FIG. 5
FIG. 7

SAILING VEHICLE

BACKGROUND OF THE INVENTION

The present invention relates to sailing vehicles, such as ice boats, land sailers or the like, that are adapted to be propelled by wind on a supporting surface.

Sailing vehicles currently in use employ movable sails in conjunction with non-steerable main running gear means such as ice runners, wheels, or the like. The movable sails make it possible to realize the proper angle of attack between the sail direction and the wind direction under various conditions of wind and course. However, significant losses in aerodynamic efficiency are inherent in this prior art construction and arrangement due to turbulent air flow behind the mast and between the boom and the fuselage. Because of these and other aerodynamic losses the maximum speed of the vehicle that can be obtained for a given wind condition is less than it should be.

SUMMARY OF THE INVENTION

The present invention has eliminated some of the inadequacies of the prior art sailing vehicles by reversing the traditional roles of the sail and running gear means in establishing the desired wind attack angle between the sail and the wind direction. In the present invention the movable sail is replaced by a rigid vertical wing and the running gear means are given a steering capability. The rigid sail increases the aerodynamic efficiency by reducing the turbulent losses around the sail and other drag forces inherent with the movable type of sail. By virtue of these improved aerodynamic characteristics, a sailing vehicle is provided which is able to obtain a higher velocity than a conventional craft in a given wind condition. Further, the rigid sail is shaped to provide greater stability and maneuverability.

According to one form of the present invention, a sailing vehicle is provided which comprises a fuselage, struts extending laterally from opposite sides of a rear portion of the fuselage, first running gear means supporting the forward end of the fuselage, second running gear means supporting the outer extremities of the struts, a rigid stationary sail having an inverted U-shape and a symmetric air foil cross section, the end portions of the sail being mounted at the outer extremities of the struts and the mid-portion of the sail extending over the rear portion of the fuselage. First steering means are provided for adjusting the yaw angle of the vehicle, said first steering means controlling the angular direction of the second running gear means. A second steering means is also provided for controlling the angular direction of the first running gear means to provide steering capabilities for the vehicle while travelling at the adjusted yaw angle. The configuration of the rigid stationary sail is such as to provide stability and maneuverability for the sailing vehicle.

Accordingly, it is an object of the present invention to provide an improved sailing vehicle that is characterized by its high aerodynamic efficiency, its stability and its maneuverability.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 1 is a perspective view of a sailing vehicle embodying the present invention;

FIG. 2 is a side elevational view of the sailing vehicle with a portion broken away to show in section the shape of the air foil;

FIG. 3 is an enlarged perspective view of a wheel assembly that comprises the front running gear means of the sailing vehicle;

FIG. 4 is a front elevational view of the sailing vehicle;

FIG. 5 is a top plan view of the sailing vehicle;

FIG. 6 is a schematic illustration of the steering controls for the sailing vehicle, showing in solid lines one position of the steering controls and in broken lines a second position; and FIG. 7 is a front elevational view of another embodiment of the invention in which circular wing is used.

DESCRIPTION OF THE PREFERRED EMBODIMENTS

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. The sailing vehicle 10 has a streamlined fuselage 12 with struts 14 and 16 extending laterally from opposite sides of the rear portion of the fuselage 12. The cockpit 18 is enclosed by a transparent canopy 20 which is adapted to shield and streamline the occupants.

First steerable running gear means 22 support the forward portion of the fuselage 12, and second steerable running gear means 24 support the outer extremities of the struts 14, 16. The latter have a streamlined outer shape. In the illustrated embodiment of the invention the runner means 22 and 24 include the wheels 26 and 28, respectively, but ice runners (not shown), or the like, can be substituted for the wheels, if desired, to permit the sailing vehicle 10 to travel on ice or another suitable form of supporting surface.

As shown in FIG. 3, the wheel 26 is mounted on a short axle shaft 30 secured in the lower end of the fork 32. The fork 32 is rigidly attached at its upper end to a shaft 34 which is rotatably mounted in a bearing assembly (not shown) at the forward end of the fuselage 12. A steering arm 36 is rigidly secured to the fork 32 and is provided with a hole 38 for attachment of steering means, to be described. The wheels 28 are similarly mounted. If it is desired to use ice runners (not shown) instead of the wheels 26, 28, such ice runners can be substituted for the wheel assemblies described.

First steering means 40 are provided for steering the running gear means 24, and second steering means 42 are provided for steering the running gear means 22. The first steering means 40 includes the larger steering wheel 44 attached to the hollow shaft 46 around which is wrapped part of the cable 48. The cable 48 extends around the pulleys 49 to the ends of the bell crank 50 which is pivotally mounted at 52. A tie rod 54 is pivotally mounted at its center on the bell crank 50, and its ends are pivotally attached to the steering arms 36 of the main wheels 28. The wheels 28 can be turned to a selected position, such as the dotted line position shown in FIG. 6, merely by turning steering wheel 44.

A second steering means 42 is provided for steering the running gear means 22 and includes the smaller steering wheel 56 which is attached to the shaft 58 around which is wrapped part of a cable 60. The cable 60 extends around the pulleys 62 and is fastened to the steering arm 36 of the front wheel 26. The wheel 26 can be turned to any desired position, such as the position shown in broken lines, merely by turning steering wheel 56.

The front wheel 26 and its associated mounting structure are partially enclosed by a flexible streamlined fairing 63. The fairing 63 is made of a suitable resilient material, such as rubber, and has a streamlined air foil shape when the wheel 26 is in its fore-and-aft aligned position. When the wheel 26 is steered from its normal fore-and-aft alignement, it will stretch to accommodate the turning of the wheel, but actual contact between the fairing 63 and the wheel 26 is prevented by a partial fender (not shown) that is attached to the wheel fork 32. The lateral or main wheels 28 are similarly enclosed in flexible streamlined fairings 64.

Extending upward from and attached to the lateral extremities of the struts 14 and 16 is a rigid stationary sail or wing 66 of inverted U-shape which has a symmetrical air foil cross section as shown at 68 in FIG. 2. The upper portion 70 can be disconnected from the upright legs or air foils 72 and 74, if desired. The two upright legs or air foils 72 and 74 are inclined from the vertical, becoming closer together at the upper ends. This inclination serves to reduce the overturning moment for a given aerodynamic side force, thereby providing stability in the vehicle. The main wheels 28 also have the same inclination or camber, so as to reduce the drag associated with a given side force resisted by the leeward wheel. The removable feature of the upper portion 70 of the rigid sail 66 is beneficial for storage purposes and also to allow sailing in high winds or when less sail is desired.

Steering of the sailing vehicle 10 is accomplished by use of the two steering wheels 44 and 56. The steering wheel 44 steers the main wheels 28 for establishing the proper angle of attack between the longitudinal axis of the sailing vehicle 10 and the direction of the wind. The steering wheel 56 can then be used for conventional steering purposes on this established course.

Other rigid sails may be employed without departure from the present invention. For example, an inverted U-shaped sail or wing 166, such as is shown in the embodiment illustrated in FIG. 7 may have the general shape of a ring wing.

It is claimed:

1. A vehicle adapted to be propelled by wind on a supporting surface comprising two generally upright air foils of symmetrical cross section and of uniform dimension throughout their lengths, one of said upright air foils extending upward from one lateral extremity of the vehicle, the other of said upright air foils extending upward from the other lateral extremity of the vehicle, and steerable running gear means at the forward end and at said lateral extremities of the vehicle for travel on said surface.

2. The vehicle that is defined in claim 1, wherein said running gear means are wheels.

3. The vehicle that is defined in claim 1, wherein an arch-shaped intermediate air foil extends between the upper ends of each of said two generally upright air foils so as to provide an inverted unitary U-shaped air foil.

4. The vehicle that is defined in claim 1, wherein said vehicle has a longitudinally extending fuselage, and struts extend laterally therefrom to each said lateral extremity.

5. The vehicle that is defined in claim 4, wherein said struts define generally horizontal air foils.

6. A vehicle adapted to be propelled by wind on a supporting surface comprising two generally upright air foils of symmetrical cross section, one of said upright air foils extending upward from one lateral extremity of the vehicle, the other of said upright air foils extending upward from the other lateral extremity of the vehicle, and steerable running gear means at the forward end and at said lateral extremities of the vehicle for travel on said surface, first steering means for steering the running gear means at the lateral extremities, and second steering means for steering the running gear means at the forward end independently of the steering means at the lateral extremities.

7. A vehicle adapted to be propelled by wind on a supporting surface comprising two generally upright air foils of symmetrical cross section, one of said upright air foils extending upward from one lateral extremity of the vehicle, the other of said upright air foils extending upward from the other lateral extremity of the vehicle, an arch-shaped intermediate air foil extending between the upper ends of each of said two generally upright air foils so as to provide an inverted unitary U-shaped air foil, said arch-shaped intermediate air foil being detachable from each of said two generally upright air foils, and steerable running gear means at the forward end and at said lateral extremities of the vehicle for travel on said surface.

8. A vehicle adapted to be propelled by wind on a supporting surface comprising two generally upright air foils of symmetrical cross section, one of said upright air foils extending upward from one lateral extremity of the vehicle, the other of said upright air foils extending upward from the other lateral extremity of the vehicle, an arch-shaped intermediate air foil extending between the upper ends of each of said two generally upright air foils so as to provide an inverted unitary U-shaped air foil, said upright air foils being substantially straight, and steerable running gear means at the forward end and at said lateral extremities of the vehicle for travel on said surface.

9. A vehicle adapted to be propelled by wind on a supporting surface comprising two generally upright air foils of symmetrical cross section, one of said upright air foils extending upward from one lateral extremity of the vehicle, the other of said upright air foils extending upward from the other lateral extremity of the vehicle, an arch-shaped intermediate air foil extending between the upper ends of each of said two generally upright air foils so as to provide an inverted unitary U-shaped air foil, said upright air foils and said arch-shaped intermediate air foil having a radius of curvature in a plane perpendicular to the longitudinal axis of the vehicle that is constant so that the unitary U-shaped air foil has a ring shape, and steerable running gear means at the forward end and at said lateral extremities of the vehicle for travel on said surface.

10. A vehicle adapted to be propelled by wind on a supporting surface comprising two generally upright air foils of symmetrical cross section, one of said upright air foils extending upward from one lateral extremity of the vehicle, the other of said upright air foils extending upward from the other lateral extremity of the vehicle, steerable running gear means at the forward end and at said lateral extremities of the vehicle for travel on said surface, a longitudinally extending fuselage, struts extending laterally therefrom to each said lateral extremity, flexible fairings extending downward from said upright air foils and enclosing the running gear means at said lateral extremities, and another flexible fairing extending downward from said fuselage and enclosing the running gear means at the forward end.

11. A sailing vehicle comprising a fuselage, struts extending laterally from opposite sides of the rear portion of the fuselage, first running gear means supporting the forward portion of said fuselage, second running gear means supporting the outer extremities of said struts, a rigid stationary sail having an inverted U-shape and a symmetrical air foil cross section of uniform dimension throughout the length of the sail, the end portions of said sail being mounted at the outer extremities of said struts and the midportion of the sail extending over the rear portion of said fuselage, and first steering means for adjusting the yaw angle of said vehicle, said first steering means controlling the angular direction of said second running gear means.

12. The sailing vehicle that is described in claim 11, wherein second steering means are provided for controlling the angular direction of said first running gear means.

13. A sailing vehicle comprising a fuselage, struts extending laterally from opposite sides of the rear portion of the fuselage, first running gear means supporting the forward portion of said fuselage, second running gear means supporting the outer extremities of said struts, a rigid stationary sail having an inverted U-shape and a symmetrical air foil cross section, the end portions of said sail being mounted at the outer extremities of said struts and the midportion of the sail extending over the rear portion of said fuselage, said midportion of said sail being detachable from the end portions of said sail, and first steering means for adjusting the yaw angle of said vehicle, said first steering means controlling the angular direction of said second running gear means.

* * * * *